US010180256B2

(12) United States Patent
Rullaud et al.

(10) Patent No.: US 10,180,256 B2
(45) Date of Patent: Jan. 15, 2019

(54) COMBUSTION CHAMBER FOR A TURBINE ENGINE WITH HOMOGENEOUS AIR INTAKE THROUGH FUEL INJECTION SYSTEM

(71) Applicant: SAFRAN AIRCRAFT ENGINES, Paris (FR)

(72) Inventors: Matthieu Francois Rullaud, Champagne sur Seine (FR); Romain Nicolas Lunel, Montereau sur le Jard (FR); Thomas Olivier Marie Noel, Brunoy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 459 days.

(21) Appl. No.: 15/023,954

(22) PCT Filed: Sep. 29, 2014

(86) PCT No.: PCT/FR2014/052446
§ 371 (c)(1),
(2) Date: Mar. 22, 2016

(87) PCT Pub. No.: WO2015/049446
PCT Pub. Date: Apr. 9, 2015

(65) Prior Publication Data
US 2016/0215983 A1    Jul. 28, 2016

(30) Foreign Application Priority Data

Oct. 1, 2013   (FR) ..................................... 13 59503

(51) Int. Cl.
*F23R 3/04*    (2006.01)
*F23R 3/28*    (2006.01)
(Continued)

(52) U.S. Cl.
CPC ................ *F23R 3/28* (2013.01); *F02C 7/222* (2013.01); *F23R 3/002* (2013.01); *F23R 3/04* (2013.01);
(Continued)

(58) Field of Classification Search
CPC ...... F23R 3/04; F23R 3/10; F23R 3/12; F23R 3/14; F23R 3/02; F23R 3/28; F23R 3/343; F23R 3/50
See application file for complete search history.

(56) References Cited

U.S. PATENT DOCUMENTS 5,289,687 A    3/1994  Kress et al.
5,323,605 A *  6/1994  Roberts, Jr. ............... F23R 3/42
                                                       60/39.37
(Continued)

FOREIGN PATENT DOCUMENTS

EP    0 564 171 A1    10/1993
EP    0 735 318 A2    10/1996
(Continued)

OTHER PUBLICATIONS

International Search Report dated Feb. 4, 2015 in PCT/FR2014/052446 filed Sep. 29, 2014.
(Continued)

*Primary Examiner* — Todd E Manahan
*Assistant Examiner* — Rene Ford
(74) *Attorney, Agent, or Firm* — Oblon, McClelland, Maier & Neustadt, L.L.P.

(57) ABSTRACT

A combustion chamber for a turbine engine, including an annular end wall provided with injection systems each centered on a respective axis and each having an upstream end forming a bushing for receiving a head of a fuel injector, and an annular shroud covering the end wall and including injector ports respectively arranged facing the injection systems, wherein the annular shroud includes air intake ports separate from the injector ports, and the bushing of each injection system crosses the corresponding injector port and includes at its upstream end a collar having a free end remote from the axis of the injection system by a first
(Continued)

distance greater than a second distance separating a rim of the injector port from the axis.

9 Claims, 8 Drawing Sheets

(51) Int. Cl.
| | | |
|---|---|---|
| *F23R 3/10* | (2006.01) | |
| *F23R 3/14* | (2006.01) | |
| *F02C 7/22* | (2006.01) | |
| *F23R 3/00* | (2006.01) | |
| *F23R 3/06* | (2006.01) | |

(52) U.S. Cl.
CPC .................. *F23R 3/06* (2013.01); *F23R 3/10* (2013.01); *F23R 3/14* (2013.01); *F23R 3/283* (2013.01); *F05D 2220/30* (2013.01); *F05D 2240/35* (2013.01)

(56) References Cited

U.S. PATENT DOCUMENTS

| | | | |
|---|---|---|---|
| 5,331,815 A * | 7/1994 | Reinhold, Jr. ............ | F23R 3/04 60/39.11 |
| 5,490,378 A | 2/1996 | Berger et al. | |
| 5,664,412 A | 9/1997 | Overton | |
| 5,934,066 A | 8/1999 | Schmid et al. | |
| 5,937,653 A * | 8/1999 | Alary ....................... | F23R 3/10 60/737 |
| 6,155,056 A | 12/2000 | Sampath et al. | |
| 7,975,487 B2 * | 7/2011 | Lockyer .................. | F23R 3/002 60/740 |

FOREIGN PATENT DOCUMENTS

| | | |
|---|---|---|
| FR | 2 704 305 A1 | 10/1994 |
| FR | 2 909 163 A1 | 5/2008 |
| FR | 2 958 015 A1 | 9/2011 |
| WO | 99/63275 A1 | 12/1999 |

OTHER PUBLICATIONS

Preliminary French Search Report dated Jun. 11, 2014 in FR 1359503 filed Oct. 1, 2013.
U.S. Appl. No. 13/579,715, filed Aug. 17, 2012, US2012/0304650 A1, Didier Hippolyte Hernandez, et al.
U.S. Appl. No. 14/778,412, filed Sep. 18, 2015, Matthieu Francois Rullaud, et al.
U.S. Appl. No. 14/750,347, filed Jun. 25, 2015, US2015/0377489 A1, Denis Jean Maurice Sandelis, et al.

* cited by examiner

COMBUSTION CHAMBER FOR A TURBINE ENGINE WITH HOMOGENEOUS AIR INTAKE THROUGH FUEL INJECTION SYSTEM

TECHNICAL FIELD

The present invention relates to an annular combustion chamber for turbine engine, especially for an aircraft propelling assembly.

The invention particularly but not exclusively applies to combustion chambers fitted with an annular row of fuel injectors each comprising a head provided with a central nose for injecting fuel and a peripheral fuel injection device, for example of the multipoint type. Injectors of this type are used in combustion chambers referred to as having "a staged lean combustion".

The invention also relates to a combustion chamber module and to a turbine engine comprising such a combustion chamber module.

STATE OF PRIOR ART

FIG. 1 illustrates a typical example of a turbine engine 1 of a known type, for example an aircraft twin spool turbofan engine.

The turbine engine 1 successively comprises, according to the thrust direction represented by the arrow 2 also corresponding to the general direction of gas flow in the turbine engine, a low pressure compressor 4, a high pressure compressor 6, an annular combustion chamber 8, a high pressure turbine 10 and a low pressure turbine 11.

In the following description, the upstream and downstream directions are defined relative to the general direction of gas flow within the combustion chamber and more generally of the turbine engine.

In a well-known manner, the combustion chamber 8 is mounted downstream of the high pressure compressor 6 for supplying pressurized air to this chamber, and upstream of the high pressure turbine 10 for rotating the high pressure compressor 6 under the effect of gas thrust coming from the combustion chamber.

FIG. 2 illustrates on a larger scale the combustion chamber 8 and its close environment.

The combustion chamber 8 comprises two respectively radially inner 12, and radially outer 13 coaxial annular walls, which extend around the longitudinal axis 14 of the combustion chamber.

These two annular walls 12 and 13 are fixed downstream to inner 15 and outer 16 casings of the chamber, and are connected to each other at their upstream end by an annular end wall 18 of the combustion chamber.

The annular end wall 18 includes an annular row of ports evenly distributed around the axis 14 of the combustion chamber, and in which injection systems 20 are mounted, in which respective heads 21 of fuel injectors 22 are respectively mounted fitted. These fuel injectors 22 each have a fuel emission axis which merges with an axis 24 of the corresponding injection system 20. The injection systems 20 are mounted in the end wall 18 so as to be able to move slightly along a direction orthogonal to the axis 24 and thus support the differential expansions affecting the combustion chamber 8, the injection systems 20 and the casings 15 and 16, in operation.

The assembly formed by the combustion chamber 8 and by the fuel injectors 22 is referred to as a "combustion chamber module" in the present description.

Each injection system 20 includes an upstream end forming a bushing 26, a downstream end taking the shape of a flared bowl 28 opening into the combustion chamber 8, and an annular air inlet 30 arranged between the bushing 26 and the bowl 28 and for letting in part 31 of the airflow 32 coming from a diffuser 34 mounted at the outlet of the high pressure compressor of the turbine engine, so as to pre-mix the admitted air with the fuel coming from the fuel injector 22 mounted in the bushing 26, within the injection system.

In the illustrated example, the annular air inlet 30 is crossed by fins 36 for imparting a rotary movement to the airflow which crosses them. The air inlet is thus of the type commonly referred to as a "swirler".

Furthermore, the annular walls 12 and 13 of the combustion chamber are connected at their upstream end to an annular shroud 40 including ports 42 arranged facing the injection systems 20 for passing fuel injectors 22 and air 31 supplying the injection systems 20. The main functions of this shroud 40 are to protect the end wall 18 of the combustion chamber and to guide parts 44 and 46 of the airflow 32 which travel downstream respectively along the inner 12 and outer 13 annular walls of the combustion chamber, within two respectively inner 48 and outer 50 bypass spaces. Hereinafter, these parts 44 and 46 of the airflow 32 are respectively referred to as "inner by pass airflow" and "outer by pass airflow". The inner 48 and outer 50 by pass spaces form, together with an upstream space 52 which connects them to each other, an enclosure in which the combustion chamber 8 extends. Of course, each port 42 is located upstream of the annular air inlet 30 relative to the axis 24 of the corresponding injection system.

However, the air supply of the annular air inlet 30 of the injection systems 20 has an inhomogeneous nature around the axis 24 of each injection system, likely to induce a reduction in the performances of the combustion chamber especially in terms of limiting emissions of pollutants and in terms of controlling the thermal profile of the exhaust gases at the outlet of the combustion chamber.

This problem is all the more significant in the case of combustion chambers implementing a combustion mode referred to as "staged lean combustion", such as the combustion chamber of FIG. 2. In this type of combustion chamber, the head 21 of each injector 22 includes a central nose 54 for injecting fuel, an axial air intake device 56 arranged around the central nose 54, and a peripheral fuel injection device 58 arranged around the axial air intake device 56. Fuel coming from the central nose 54 mixes, within each injection system, with the air admitted through the axial air intake device 56, whereas the fuel coming from the peripheral fuel injection device 58 mixes, within each injection system, with the air admitted through the annular air inlet 30 of the injection system. But, the injection systems of this type have relatively large transverse overall dimensions, likely to increase the inhomogeneities of the airflow 31. Moreover, these injection systems require a relatively considerable airflow in order to operate, which tends to emphasize heterogeneities in the combustion chamber 8.

The above-described problems are particularly significant in the case of a combustion chamber arranged at the outlet of a centrifugal type diffuser 34', as illustrated in FIG. 3.

In this case indeed, a radially outer part of the annular air inlet 30 of each injection system 20 receives a direct airflow 31a whereas a radially inner part of the annular inlet 30 only receives an indirect airflow 31b.

DISCLOSURE OF THE INVENTION

The object of the invention is especially to bring a simple economical, and efficient solution to these problems, enabling the abovementioned drawbacks to be at least in part avoided.

To do so, the invention provides an annular combustion chamber for a turbine engine, comprising:

an annular end wall provided with a plurality of injection systems each centred on a respective axis and each having an upstream end forming a bushing for receiving a head of a fuel injector, a downstream end opening into said combustion chamber, and an annular air inlet arranged between said upstream and downstream ends so that the air admitted through said annular air inlet mixes, within the injection system, with the fuel coming from the fuel injector, and an annular shroud covering an upstream side of said end wall and comprising a plurality of injector ports respectively arranged facing said injection systems, said annular shroud and said end wall delimiting together an annular space into which the annular air inlet of each injection system opens.

According to the invention, said annular shroud includes a plurality of air intake ports separate from said injector ports.

Furthermore, said bushing of each of said injection systems crosses the corresponding injector port of said annular shroud and comprises at its upstream end an annular collar having a free end remote from said axis of the injection system by a first distance greater than or equal to a second distance separating a rim of said corresponding injector port from said axis of the injection system.

The annular collar of the bushing of each injection system enables the inlet of the corresponding injector port of the annular shroud to be concealed and thus the airflow supplying the annular air inlet of the injection system via said injector port to be reduced to substantially nothing. The supply of the annular air inlet is thus nearly exclusively indirectly provided by air passing through the air intake ports of the annular shroud.

This results in a better homogeneity of the air supply of the annular air inlet of each injection system, as will appear more clearly hereinafter.

Moreover, this configuration makes it possible to maintain the mobile nature of each injection system relative to the annular shroud and to the end wall of the combustion chamber.

Preferably, said air intake ports and said injector ports are distributed so that at least one air intake port is circumferentially arranged between each pair of consecutive injector ports along the circumference of said annular shroud.

Such a distribution enables the homogeneity of the air supply of the annular air inlet of each injection system to be optimized.

In this case, said air intake ports are preferably alternately distributed with said injector ports along the circumference of said annular shroud.

The invention also relates to a combustion chamber module for a turbine engine, comprising:

an annular combustion chamber of the above-described type, and an annular row of fuel injectors comprising respective injector heads mounted fitted respectively in said bushings of the injection systems of said combustion chamber.

The invention advantageously applies to such a combustion chamber module, wherein each injector head includes a central nose for injecting fuel, an axial air intake device arranged around said central nose, and a peripheral fuel injection device arranged around said axial air intake device.

Furthermore, said injector ports of said annular shroud advantageously have respective isobarycentres inscribed on a first circle centred on an axis of said combustion chamber and having a first diameter.

In a first preferred embodiment of the invention, said air intake ports of said annular shroud have respective isobarycentres inscribed on a second circle centred on the axis of said combustion chamber and having a second diameter strictly greater than said first diameter of said first circle.

In a second preferred embodiment of the invention, said air intake ports of said annular shroud have respective isobarycentres inscribed on said first circle.

The invention finally relates to a turbine engine for an aircraft, comprising a combustion chamber module of the above-described type.

BRIEF DESCRIPTION OF THE DRAWINGS

The invention will be better understood, and further details, advantages and features of the invention will appear upon reading the following description made by way of non-limiting example and with reference to the accompanying drawings in which.

Throughout these figures, identical references can refer to identical or analogous elements.

DETAILED DISCLOSURE OF PREFERRED EMBODIMENTS

Figure 1:
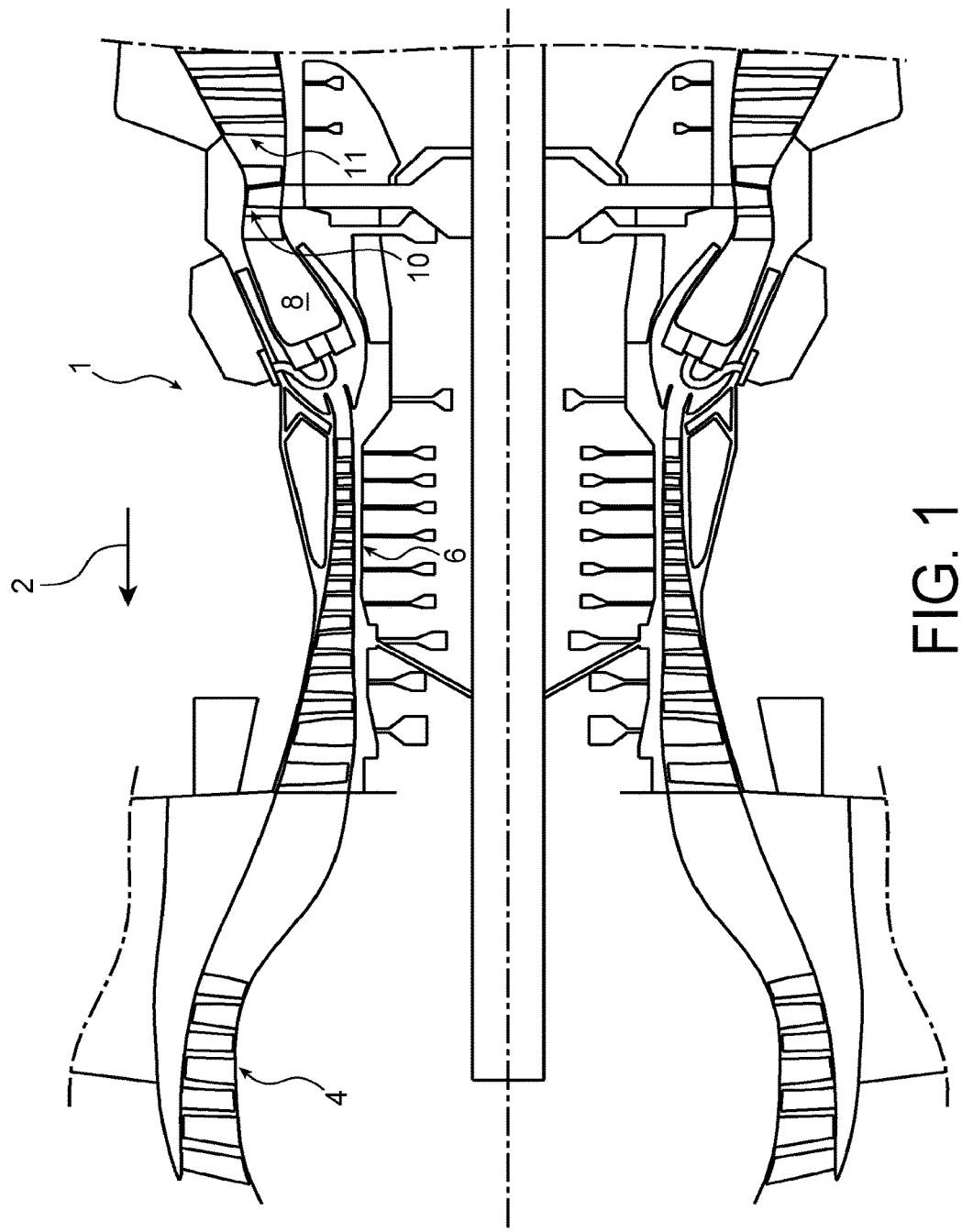
FIG. 1, already described, is an axial cross-section partial schematic view of a known type turbine engine.
Figure 4:
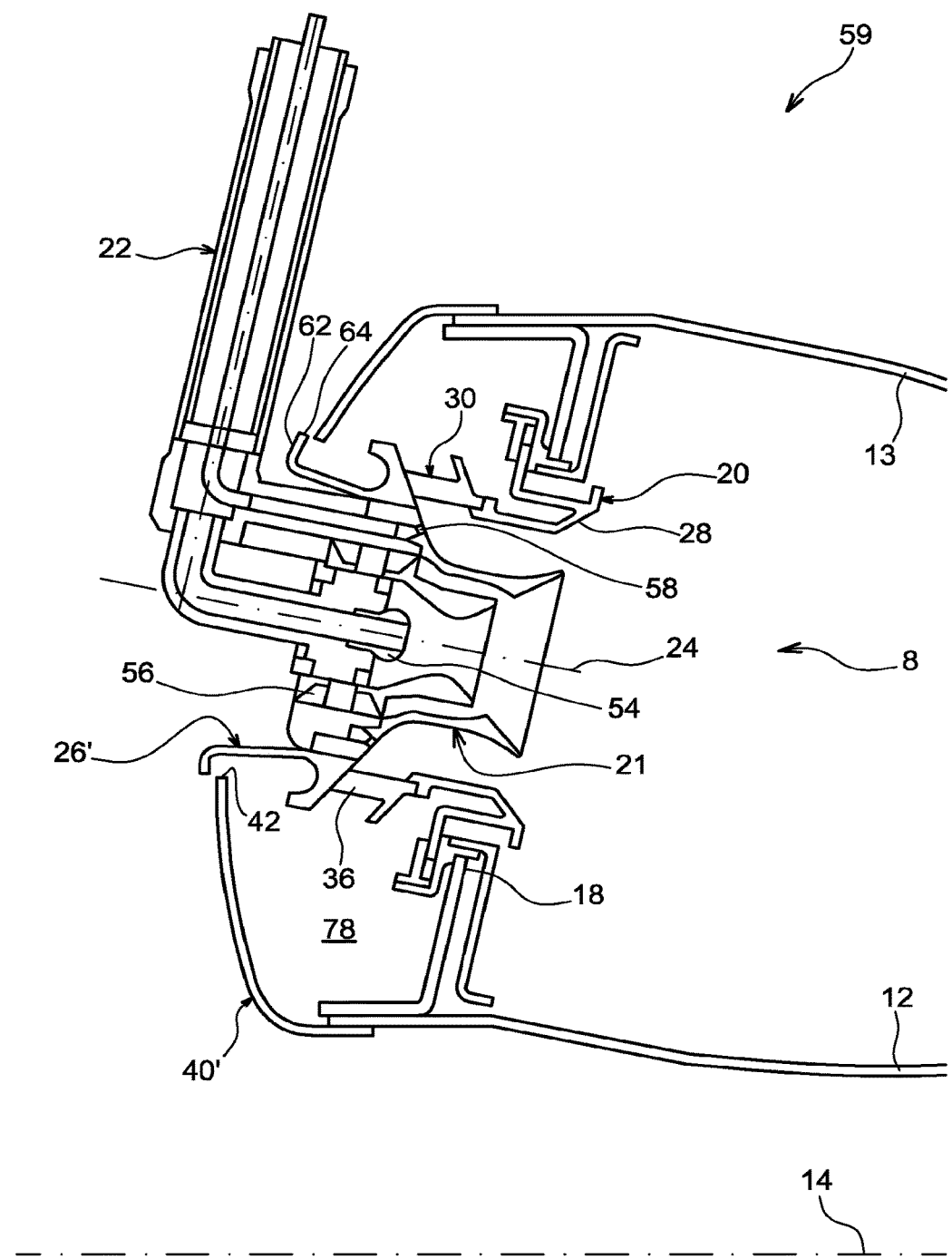
FIG. 4 is an axial cross-section partial schematic view of a combustion chamber module of a turbine engine according to a first preferred embodiment of the invention.
Figure 5:
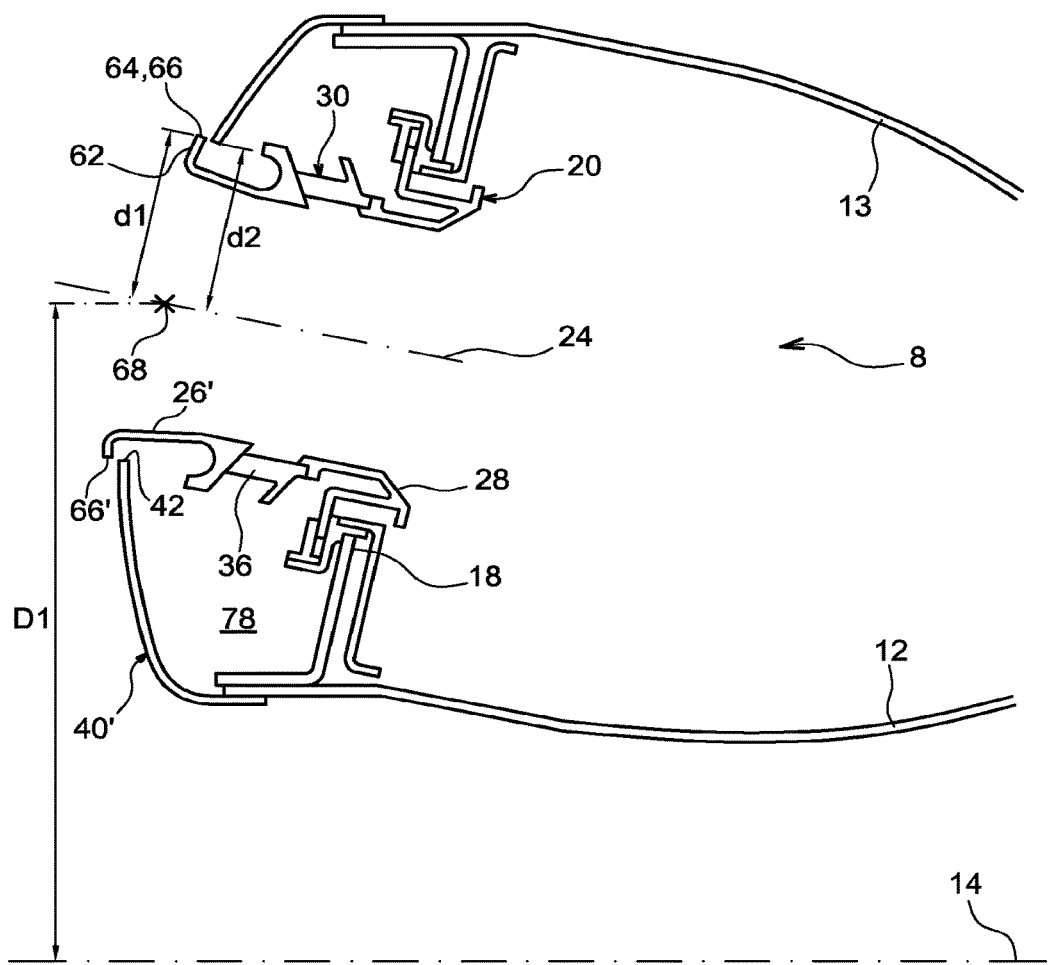
FIG. 5 is an axial cross-section partial schematic view of a combustion chamber belonging to the combustion chamber module of FIG. 4, shown isolated.
Figure 6:
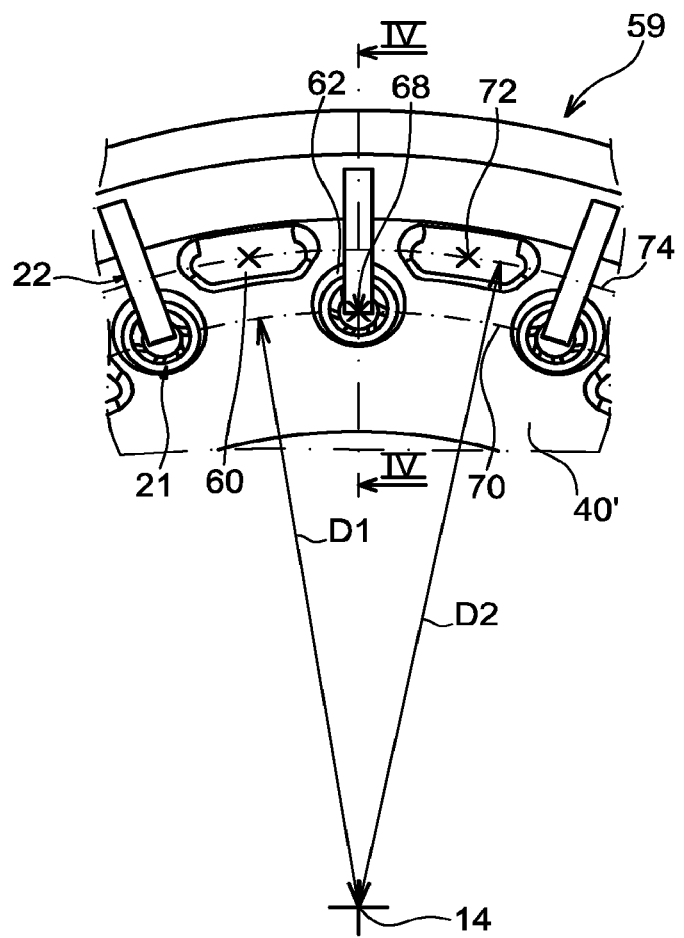
FIG. 6 is a partial schematic view of the combustion chamber module of FIG. 4, from upstream.

FIGS. 4 to 6 illustrate part of a combustion chamber module 59 according to a first preferred embodiment of the invention. This combustion chamber module is part of a turbine engine the other parts of which can be of a conventional type, such as illustrated in above-described FIG. 1.

FIGS. 4 to 6 more particularly show a rear part of the combustion chamber 8 as well as the injectors 22 of the combustion chamber module, whereas FIG. 5 illustrates only the rear part of the combustion chamber 8.

As appears in FIG. 6, the annular shroud 40' which covers the upstream side of the combustion chamber 8 includes a plurality of air intake ports 60 separate from the injector ports 42. In the illustrated example, the air intake ports 60 are alternately distributed with the injector ports 42 along the circumference of the annular shroud 40'. In a known manner per se, each injector port 42 is located upstream of the annular air inlet 30 relative to the axis 24 of the corresponding injection system.

As shown in FIGS. 4 and 5, the bushing 26' of each injection system 20 crosses the corresponding injector port 42 of the annular shroud 40'.

The bushing 26' comprises at its upstream end an annular collar 62. This annular collar 62 has a free end 64 remote from the axis 24 of the injection system 20 by a first distance d1 (FIG. 5) greater than or equal to a second distance d2 separating a rim of said injector port 42 from the axis 24 of the injection system.

In the illustrated example, the annular collar 62 does not have a rotational symmetry. Indeed, the first distance d1 slightly varies around the axis 24 of the injection system.

More precisely, a radially outer part of the annular collar 62 is more extended than a radially inner part of the latter. Thus, in the axial section plane of FIG. 5, the radially outer side 66 of the free end 64 is more distant from the axis 24 of the injection system than the radially inner side 66' of the free end 64.

Similarly, the injector port 42 does not have a rotational symmetry, so that the second distance d2 slightly varies around the axis 24 of the injection system.

The above disparity between the first distance d1 and the second distance d2 stands within each axial section plane of the combustion chamber module.

Besides, in the illustrated example, the combustion chamber is of the staged lean combustion type. Thus, each injector head includes a central nose 54 for injecting fuel, an axial air intake device 56 arranged around said central nose 54, and a peripheral fuel injection device 58 arranged around said axial air intake device. This peripheral device 58 is for example of the "multipoint" type, that is including an annular row of fuel ejection ports.

As shown in FIG. 6, the injector ports 42 of the annular shroud 40' have respective isobarycentres 68 inscribed on a first circle 70 centred on the axis 14 of the combustion chamber 8 and having a first diameter D1.

In the first embodiment of the invention, the air intake ports 60 of the annular shroud 40' have respective isobarycentres 72 inscribed on a second circle 74 centred on the axis 14 of the combustion chamber 8 and having a second diameter D2 strictly greater than the first diameter D1 of said first circle 70.

Figure 3:
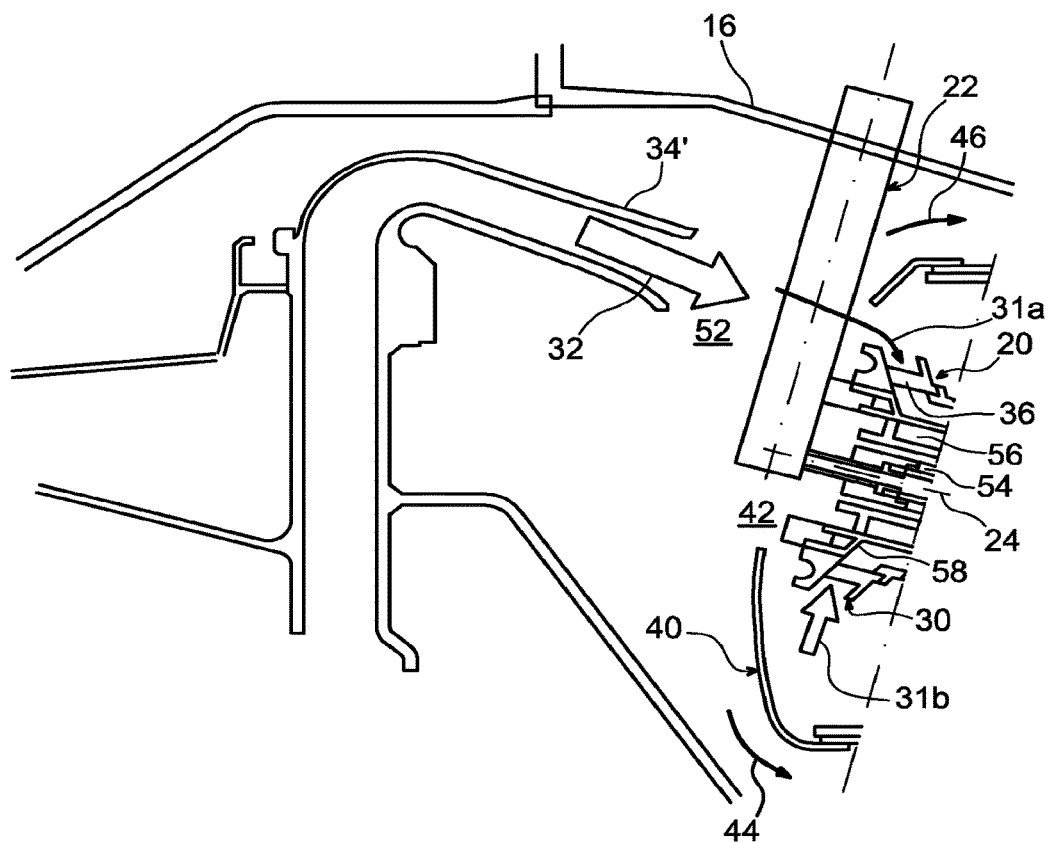
FIG. 3, already described, is an axial cross-section partial schematic view of a combustion chamber module of a known type turbine engine, comprising a centrifugal diffuser.

Thus, the air intake ports 60 are radially offset outwardly of the annular shroud 40'. This configuration is particularly advantageous when the diffuser supplying air to the combustion chamber is of the centrifugal type, as in the prior art example illustrated in FIG. 3.

In the example of FIG. 6, the air intake ports 60 have an oblong shape along the circumferential direction. Furthermore, each air intake port 60 is remote from the first abovementioned circle 70.

Figure 7:
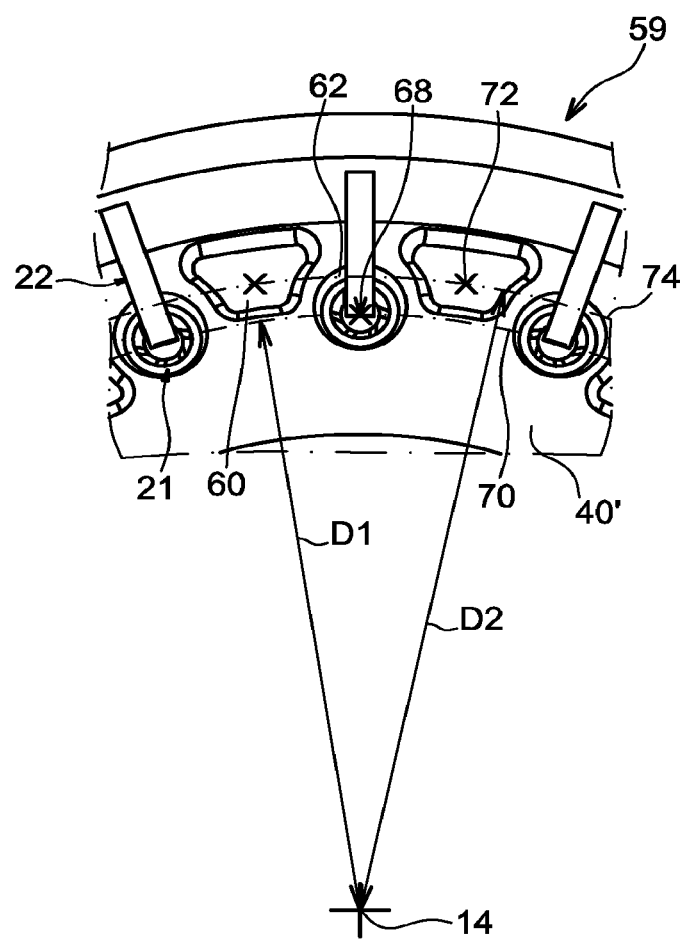
FIG. 7 is a view similar to FIG. 6, illustrating an alternative embodiment of the combustion chamber module of FIG. 4.

Alternatively, each air intake port 60 can extend up to the first circle 70, as illustrated in FIG. 7. In this case, the rim of each air intake port 60 advantageously has curved side regions so as to substantially follow the curve of the injector port 42 located nearby.

Figure 8:
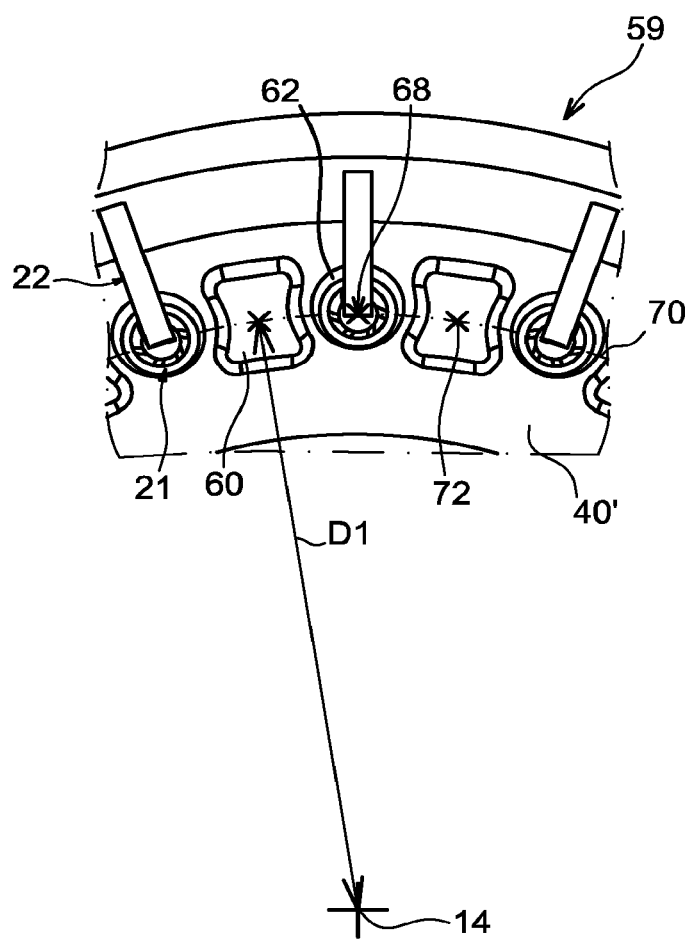
FIG. 8 is a view similar to FIG. 6, illustrating a combustion chamber module of a turbine engine according to a second preferred embodiment of the invention.

In a second preferred embodiment of the invention illustrated in FIG. 8, the air intake ports 60 of the annular shroud 40' have respective isobarycentres 72 inscribed on the first circle 70.

Figure 2:
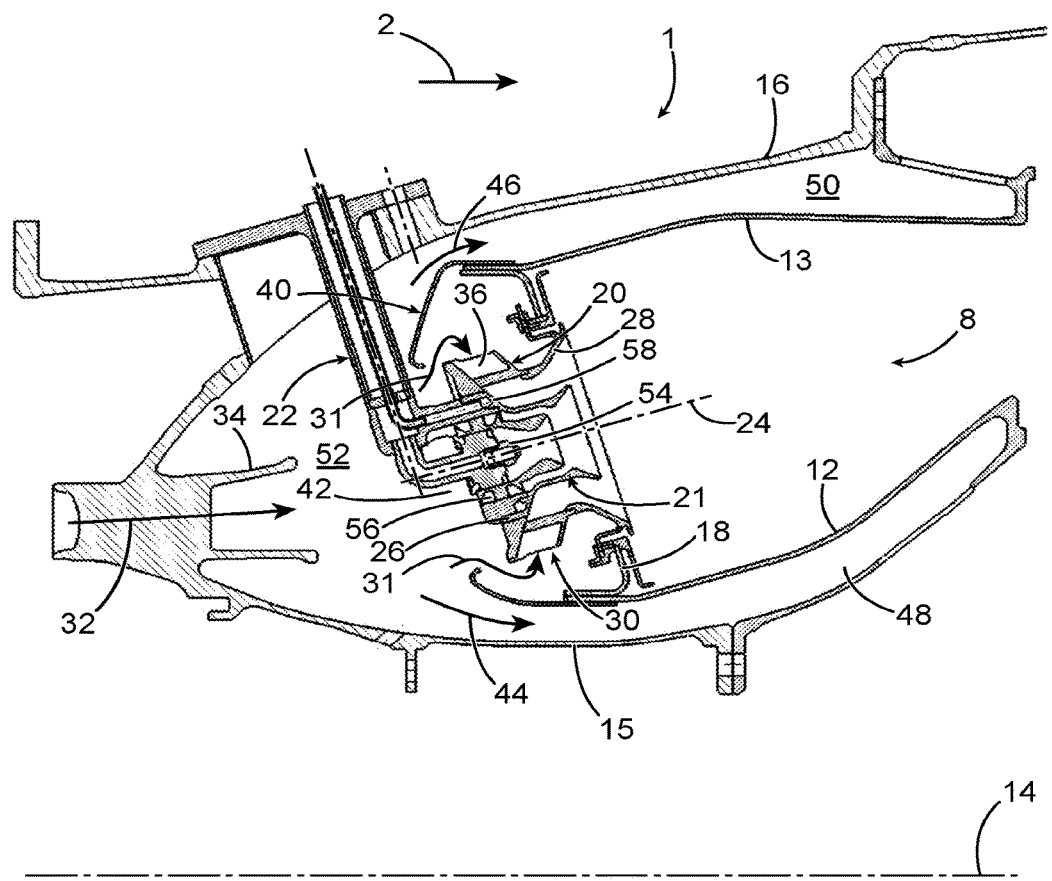
FIG. 2, already described, is an axial cross-section partial schematic view of a combustion chamber module of the turbine engine of FIG. 1, comprising an axial diffuser.

This configuration is particularly advantageous when the diffuser supplying air to the combustion chamber is of the axial type, as in the prior art example illustrated in FIG. 2.

In every case, in operation, the air supplying the annular air inlet 30 of each injection system 20 exclusively or nearly exclusively passes through the air intake ports 60 of the annular shroud 40'. Indeed, the annular collar 62 of the bushing of each injection system 20 substantially prevents the passage of air around each injection system through the corresponding injector port 42. The annular collar 62 and the rim of the injector port 42 indeed form an annular baffle for the airflow coming from the diffuser supplying the combustion chamber with pressurized air.

For this reason, the air supplying the annular air inlet 30 of each injection system 20 first travels by swirling within a space 78 (FIG. 4) defined between the annular end wall 18 and the annular shroud 40' of the combustion chamber.

This results in an improved homogeneity of the air supply of the annular air inlet 30 around its respective axis.

In the above-described preferred embodiments, the injector and air intake ports are distributed so as to alternate.

As an alternative, other configurations are possible without departing from the scope of the invention.

Generally speaking, to provide an optimum homogeneity of the air supply of the annular air inlet 30 of each injection system, the air intake ports 60 and the injector ports 42 are preferably distributed so that at least one air intake port 60 is circumferentially arranged between each pair of consecutive injector ports 42 along the circumference of the annular shroud 40'.

The invention claimed is:

1. An annular combustion chamber for a turbine engine, comprising:

an annular end wall provided with a plurality of injection systems each centered on a respective axis and each having an upstream end forming a bushing for receiving a head of a fuel injector, a downstream end opening into said combustion chamber, and an annular air inlet arranged between said upstream and downstream ends so that the air admitted through said annular air inlet mixes, within the injection system, with the fuel coming from the fuel injector, and an annular shroud covering an upstream side of said end wall and comprising a plurality of injector ports respectively arranged facing said injection systems, said annular shroud and said end wall delimiting together an annular space into which the annular air inlet of each injection system opens, wherein said annular shroud includes a plurality of air intake ports separate from said injector ports, and wherein said bushing of each of said injection systems crosses the corresponding injector port of said annular shroud and comprises, at an upstream end of the bushing, an annular collar having a free end remote from said axis of the injection system by a first distance greater than or equal to a second distance separating a rim of said corresponding injector port from said axis of the injection system.

2. The annular combustion chamber according to claim 1, wherein said injector ports are distributed according to a plurality of pairs of consecutive injector ports so that at least one of the air intake ports is circumferentially arranged between each pair of consecutive injector ports along a circumference of said annular shroud.

3. The annular combustion chamber according to claim 2, wherein said air intake ports are alternately distributed with said injector ports along the circumference of said annular shroud.

4. A combustion chamber module for a turbine engine, comprising:
 the annular combustion chamber according to claim 1, and
 an annular row of fuel injectors comprising respective injector heads mounted respectively fitted in said bushings of the injection systems of said combustion chamber.

5. The combustion chamber module according to claim 4, wherein each injector head includes a central nose for injecting fuel, an axial air intake device arranged around said central nose, and a peripheral fuel injection device arranged around said axial air intake device.

6. The combustion chamber module according to claim 4, wherein said injector ports of said annular shroud have respective geometric center points inscribed on a first circle centered on an axis of said combustion chamber and having a first diameter.

7. The combustion chamber module according to claim 6, wherein said air intake ports of said annular shroud have respective geometric center points inscribed on a second circle centered on the axis of said combustion chamber and having a second diameter strictly greater than said first diameter of said first circle.

8. The combustion chamber module according to claim 6, wherein said air intake ports of said annular shroud have respective geometric center points inscribed on said first circle.

9. A turbine engine for an aircraft, comprising the combustion chamber module according to claim 4.

* * * * *